T. R. BILLINGS.
CHARGE PREHEATER.
APPLICATION FILED JUNE 22, 1917.

1,301,999.

Patented Apr. 29, 1919.
3 SHEETS—SHEET 1.

Witnesses

Inventor
T. R. Billings
By his Attorneys

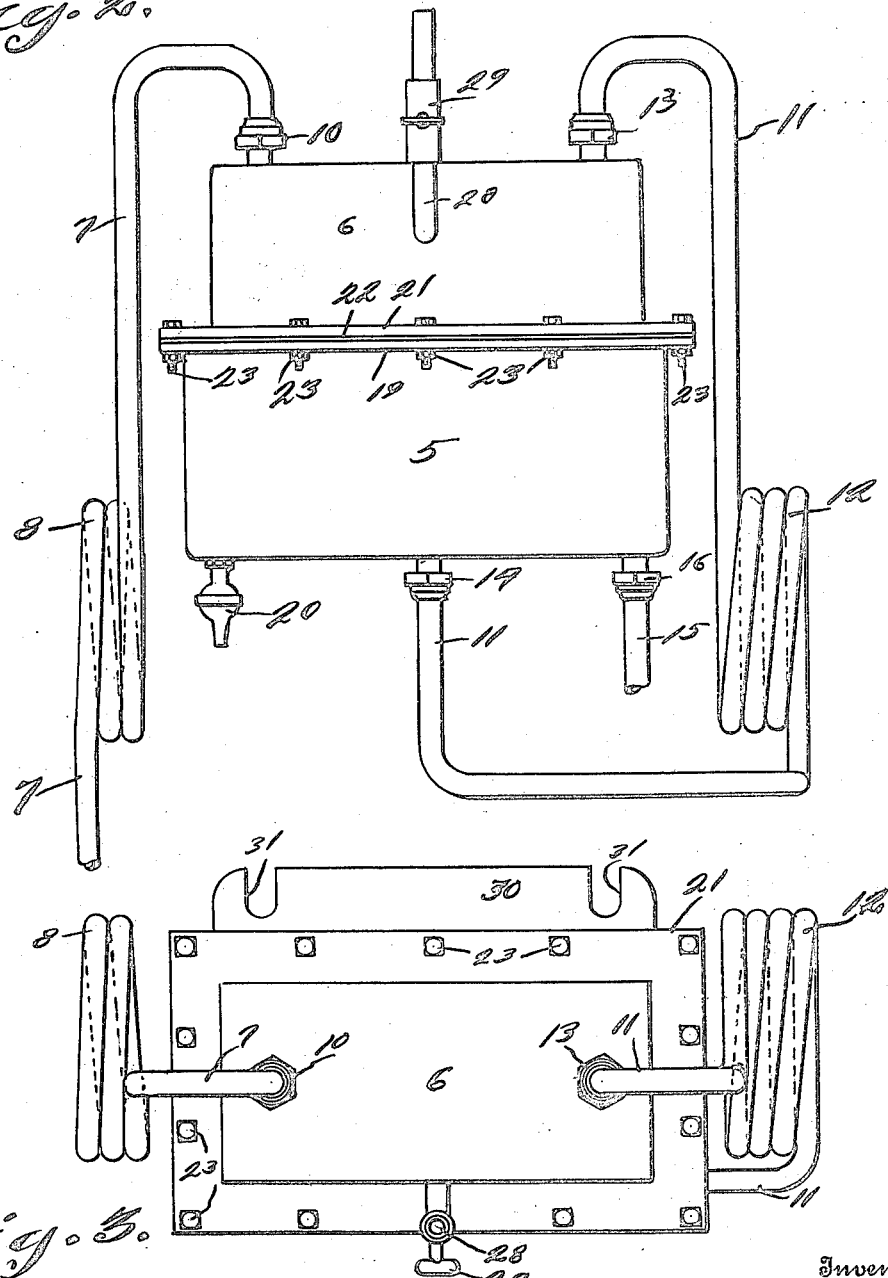

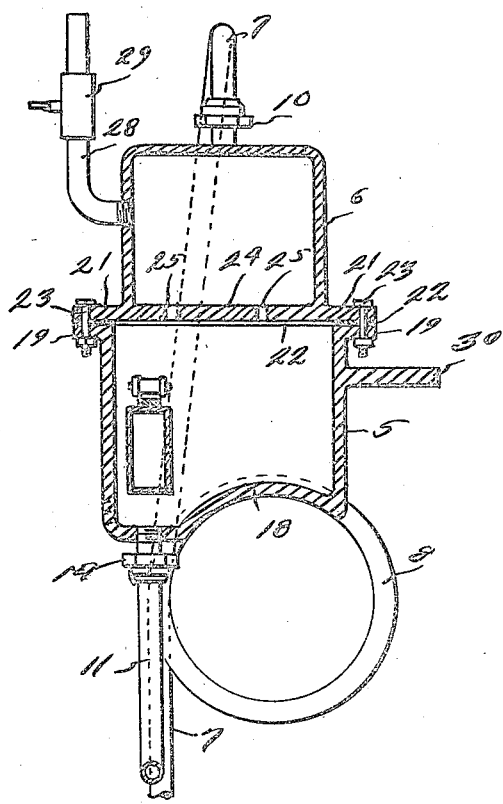
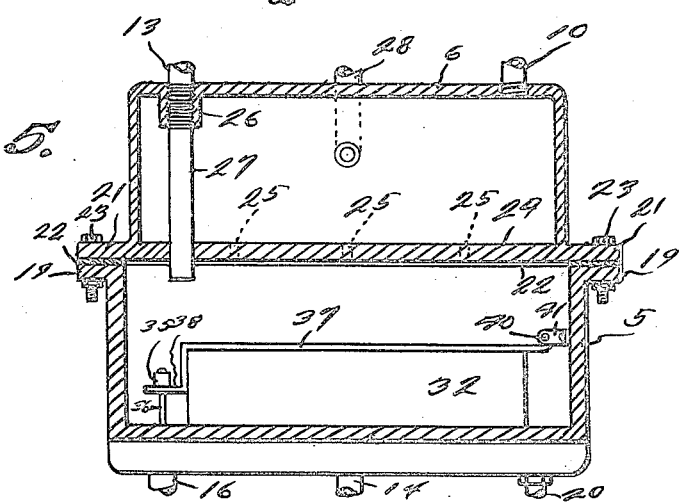

UNITED STATES PATENT OFFICE.

THOMAS R. BILLINGS, OF BIEBER, CALIFORNIA.

CHARGE-PREHEATER.

1,301,999.   Specification of Letters Patent.   Patented Apr. 29, 1919.

Application filed June 22, 1917. Serial No. 176,353.

*To all whom it may concern:*

Be it known that I, THOMAS R. BILLINGS, a citizen of the United States, residing at Bieber, in the county of Lassen, State of California, have invented a new and useful Charge-Preheater; and I do hereby declare the following to be a full, clear, and exact description of the invention, such as will enable others skilled in the art to which it appertains to make and use the same.

The invention relates to preheating devices for internal combustion engines.

One of its objects is the provision for injecting a jet of steam into the intake manifold, whereby the atomized fuel may be preheated before entering the engine cylinders, thus making a higher explosive mixture which considerably lessens the deposits of carbon in the cylinder.

A further object is the provision of a means for generating steam from the heat of the exhaust manifold.

A still further object is the provision of a miniature boiler and steam chest on the exhaust manifold and means to supply this boiler with water taken from the water jacket.

A still further object is to provide means for the automatic control of the water admitted to the boiler, whereby it may be maintained at a pre-determined level.

Other objects will appear in the detailed description which follows.

It is understood that the invention is not to be confined to the exact construction herein disclosed, but that changes may be made, within the scope of what is claimed.

In the drawings:—

Fig. 2 is an enlarged elevation of the invention detached from the engine.

Fig. 3 is a top plan view.

Fig. 4 is a central transverse sectional view.

Fig. 5 is a longitudinal sectional view, the exterior piping being omitted.

Figure 1:
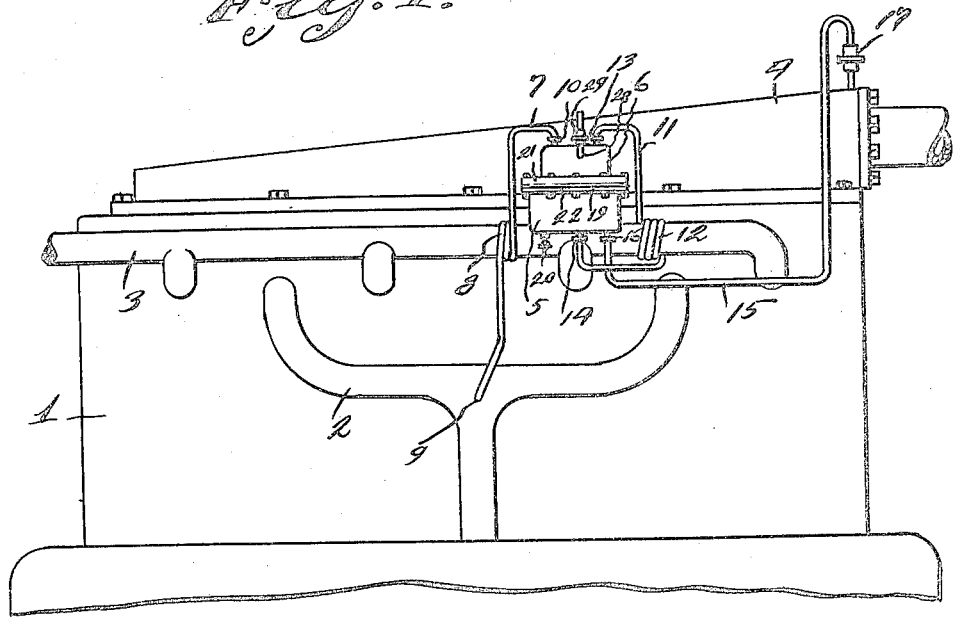
Figure 1 is a side elevation of an internal combustion engine, such as is used on an automobile, showing the invention attached thereto.

Referring to the drawings, 1 represents an internal combustion engine provided with an intake manifold 2 and an exhaust manifold 3. This engine is designed to be water jacketed in the customary manner, the top of the water jacket being designated as 4. The boiler 5 and its attendant steam chest 6 is positioned on top of the exhaust manifold 3.

A pipe 7 is connected to the top of the steam chest at one end, this pipe encircling the exhaust manifold with its coils 8 and being connected to the intake manifold as indicated at 9 in Fig. 1. The pipe 7 may be connected with the intake manifold in any suitable manner, but it is connected to the steam chest 6 by the union 10. By means of a union 13 a pipe 11 is connected to the steam chest 6. This pipe also encircles the exhaust manifold with its coils 12 and connects with the boiler 5 on the bottom by means of a union 14. The pipe 15 also connects with the boiler 5 on the bottom through the medium of the union 16 but this pipe leads to the water jacket 4 and is provided with a valve 17 positioned close to the water jacket.

The boiler 5 is substantially a rectangular tank having a concave bottom portion 18 corresponding to the curved outline of the exhaust manifold upon which this concave portion rests when the boiler is attached to an engine. To the front of the concave portion 18 the bottom of the boiler is flat, and in this flat portion the unions 14 and 16 are threaded, a drain-cock 20 also being secured to this flat bottom portion to permit the boiler 5 to be readily emptied when desired. On the top edge the boiler 5 is provided with a pivotal flange 19 on which reposes the flange 21 of the steam chest 6, the two flanges having a suitable gasket 22 interposed between them and being secured together by bolts 23.

The steam chest 6 and boiler 5 being secured together by means of their flanges 21 and 19, the bottom 24 of the steam chest acts as the top of the boiler, but communication between the steam chest and the boiler is effected by means of the apertures 25 formed in the bottom 24.

On top of the steam chest 6 the unions 10 and 13 are connected in the same way as the unions 14 and 16 are connected to the bottom of the boiler 5. Below the point 13 where the union is connected, the steam chest 6 is provided with an annular depending projection 26 which is tapped to receive the threaded end of the pipe 27 which passes down through the bottom 24 and terminates in the boiler 5, thus effecting communication between the boiler and the union 13.

The steam chest 6 is provided with an upwardly extending pipe 28 threaded into a hole on the front of the steam chest. This pipe is provided with a valve 29, so that steam may be allowed to escape from the steam chest in case of excessive pressure.

On its back the boiler 5 is provided with an integral lateral flange 30 having recesses 31 close to its extremities (Fig. 3). This flange is designed for attachment to the engine casing and serves to secure the boiler and steam chest in place.

Figure 6:
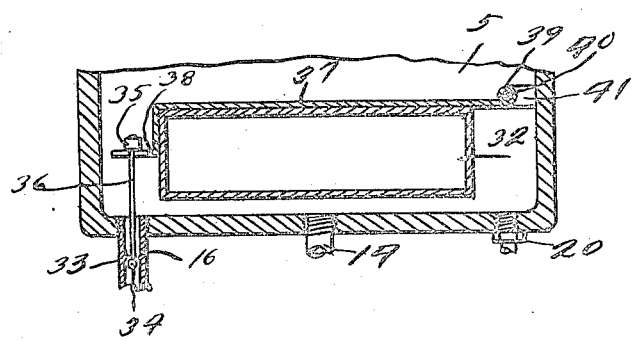
Fig. 6 is a longitudinal sectional view through the float-valve which controls the admission of water into the boiler.

The boiler is provided with a float valve for controlling the admission of water. This valve is located in the union 16, the bore of which is contracted as shown at 33 in Fig. 6. The ball 34 seats on the under side of this contracted portion 33 and operates to close the opening in the union 16 when seated. A stem 36 is secured to the ball and has attached at its upper end a knob 35 which rests upon the bifurcated end 38 of the strip 37, this bifurcated end straddling the stem 36. The strip 37 is secured in any suitable way to the float 32 beyond the end of which it extends and terminates in the cylindrical piece 39 which surrounds the stud 40, this stud being fixed between the ears 41 that are attached to one of the end walls of the boiler 5.

It will be observed that the float 32 thus pivotally mounted in the boiler 5 will rise or fall depending on whether the water in the boiler is at a high or low level. If the water is low, the float is permitted to lower and the valve 34 is thus allowed to drop from its seat 33, whereupon the water is admitted from the water jacket into the boiler until it attains a level in the boiler sufficient to raise the float 32 high enough to close the valve 34. The water for boiler is obtained from the water jacket through the pipe 15 and union 16 wherein the valve is situated.

The boiler 5 by contact with the exhaust manifold on its concave portion 18 utilizes the heat derived from the manifold to reduce the contained water into steam which rises and passes through the apertures 25 into the steam chest 6, leaving the latter through the pipe 7 and entering the intake manifold where it mixes with the atomized fuel. The coils 8 in the pipe 7 which encircle the exhaust manifold act as a superheating means for the steam before it enters the intake manifold and operate to thoroughly eradicate the moisture from the steam.

For the water in the boiler 5 there is provided a supplementary heating means in the form of the pipe 11 with its coils 12. This pipe 11 acts as a means to accelerate the generation of steam. The cooler water in the boiler drops down into the lower part of the pipe 11 and fills the coils 12 which derive heat from the exhaust manifold and heat the water causing it to rise in the pipe 11 and to reënter the boiler through the pipe 27. In this way a circulation is set up in the pipe 11 which tends to keep the water at a uniform temperature and to aid the boiler in the generation of steam.

In case of excessive steam pressure, the steam may be allowed to escape through the pipe 28 by opening the valve 29, which valve is closed when the pressure is sufficiently reduced.

What is claimed is:

1. In a charge preheater for internal combustion engines the combination with an exhaust manifold, and an intake manifold below the exhaust manifold; of a boiler on the exhaust manifold partially fitting the circumference thereof, a steam chest on the top of the boiler, a plate interposed between the boiler and the steam chest and having perforations of communication between the interiors of the boiler and the steam chest, a pipe connecting the boiler and the water jacket of the engine, means in said pipe for controlling the water from the jacket into the boiler, a member in the boiler connected to said means and automatically actuated by and according to the level of the water to control said means, a conduit connected to the bottom of the boiler and being in turn passed through the top of the steam chest and again communicatively connected to the boiler through the interposed plate, an intermediate portion of said conduit being coiled about the exhaust manifold and having a portion below the boiler for trapping the cooler water in the boiler, whereby it may derive heat from said coil and reënter the boiler through the interposed plate, thereby setting up a circulation and unifying the temperature of the water in the boiler and aiding in the generation of steam, a pipe having one end connected to the top of the steam chest communicatively therewith its other end to the intake manifold for conveying the steam thereinto, and having its intermediate portion coiled about the exhaust manifold, thereby maintaining the temperature of the steam.

2. In a charge preheater for internal combustion engines, the combination with intake and exhaust manifolds, of a boiler on the exhaust manifold having water supply connections with the water jacket of the engine and provided with automatically operated means to control the water into the boiler; a steam chest on the boiler, a plate interposed between the steam chest and the boiler and provided with means communicatively connecting the interiors of the boiler and the chest, a tube having one end connected to the bottom of the boiler, its other end passing through the steam chest and connected to the top of the boiler communicatively therewith, and its intermediate portion coiled about the exhaust manifold, the portion of said tube between its coils and the bottom of the boiler being below the boiler and adapted to trap the cooler water from the boiler filling the coils deriving heat from the exhaust manifold, whereby it may rise in the tube above the coils and reënter the boiler through its portion passing through the steam chest, maintaining a circulation and unifying the temperature of the water and aiding in the generation of steam in the boiler, and a pipe, one end thereof connected to the top of the steam chest, its other end to the intake manifold, and its intermediate portion coiled about the exhaust manifold.

In testimony whereof I have signed my name to this specification in the presence of two subscribing witnesses.

THOMAS R. BILLINGS.

Witnesses:
H. HANCOCK,
W. F. HOLLAND.